PIPE CUTTING APPARATUS

Filed June 28, 1965 2 Sheets-Sheet 1

INVENTOR
Harold F. Livers
BY
William S. Dorman
ATTORNEY

Nov. 5, 1968 H. F. LIVERS 3,409,282
PIPE CUTTING APPARATUS
Filed June 28, 1965 2 Sheets-Sheet 2
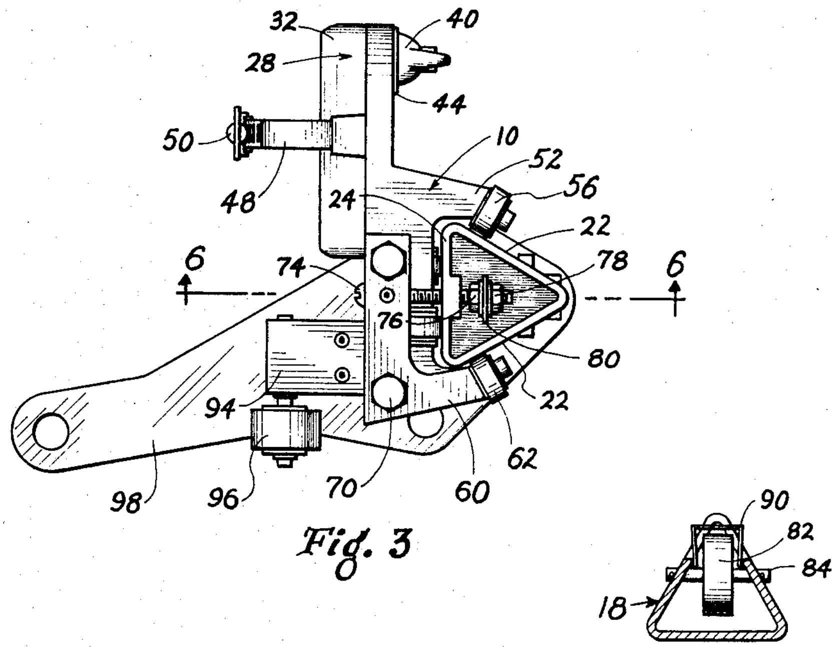
Fig. 3
90
82
84
18
Fig. 5
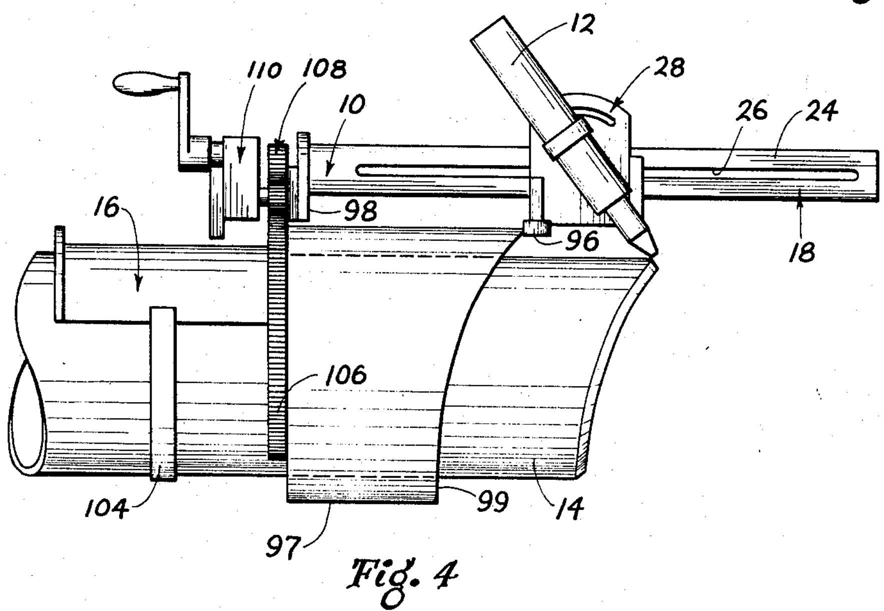
Fig. 4
INVENTOR
Harold F. Livers
BY, William S. Dorman
ATTORNEY 3,409,282
Patented Nov. 5, 1968

3,409,282

PIPE CUTTING APPARATUS

Harold F. Livers, Kansas City, Mo., assignor to Mary C. Harter, Tulsa, Okla.

Filed June 28, 1965, Ser. No. 467,384
9 Claims. (Cl. 266—23)

ABSTRACT OF THE DISCLOSURE

A pipe cutting apparatus for a pipe cutting machine wherein a pipe cutting torch is slidably mounted on a support member which is secured to the pipe cutting machine. A negator spring is connected between the support structure and the cutting torch for constantly urging the torch in a direction toward the pipe cutting machine, and the support structure and cutting torch are moved around the outer periphery of the pipe by the pipe cutting machine whereby the end of the pipe may be beveled or otherwise cut by the cutting torch.

This invention relates to improvements in pipe cutting apparatus and more particularly, but not by way of limitation, to slide support for a cutting torch for facilitating cutting around the outer periphery of a pipe in a circular path of an irregular shape or configuration.

In the cutting of pipes it is a common practice today to move a cutting torch circumferentially aroud the outer periphery of a pipe for effecting an angular cut through the wall of the pipe. It is frequently desirable to provide a variable contour or shaped cutting edge for the pipe end in order to facilitate the abutting of two adjacent pipe sections for joining or welding thereof.

The most common type of apparatus in use today for effecting selected or shaped cuts in the wall of a pipe normally utilizes a guide template of the desired shaped contour in order to guide the cutting torch in a combined circular and reciprocal longitudinal path as the torch is moved around the periphery of the pipe. The cutting torch is usually slidable mounted on a pair of parallel rail members to provide for the reciprocal movement of the torch in accordance with the shape of the guide template, as shown in the P. A. Howard Patent No. 2,408,517, issued Oct. 1, 1946, and entitled "Pipe Cutting Apparatus." However, this type of shape cutting apparatus has certain disadvantages in that the slidable members disposed on the parallel rail members often bind during the reciprocal or linear movement of the torch, and the friction between the moving torch and support rails is extremely great, thereby causing a distortion or jerking movement of the torch. The torch often tends to chatter on the rail and frequently will not move in a smooth path during the cutting operation. Thus, the resultant cut on the end of the pipe may not conform to the desired contour of the template, and the cut edge may be jagged or uneven. It will be apparent that the untrue contour and unevenness of the cut edge will be disadvantageous in the abutting of two adjacent pipe sections because the two sections will not fit together snugly.

The present invention contemplates a novel slide support apparatus for a cutting torch which is particularly designed and constructed for reducing the binding and friction between the reciprocating torch and the support member to provide a more efficient cutting operation. The novel slide support comprises a longitudinally extending slide bar having a substantially triangular cross sectional configuration for receiving a movable torch holder thereon. The torch holder is provided with roller members for engaging the sides of the support member in a manner whereby the holder and torch carried thereby may move readily therealong with a minimum of friction. In addition, negator spring means is provided in combination with the slide support and torch holder member for constantly urging the torch holder in a position of engagement with the guide template for assuring an accurate contour cutting of the pipe end. The torch holder may be angularly adjusted in opposite directions from a vertical position whereby the torch may be utilized for either the usual front beveling operation, or may be utilized for a back beveling operation without turning or reversing of the torch holder.

It is an important object of this invention to provide a novel slide support apparatus for a cutting torch for utilization with pipe cutting machine to facilitate the selected cutting of the wall of a pipe.

It is another object of this invention to provide a novel shape cutting apparatus for efficiently cutting a selected cut on the wall of a pipe in a manner accurately conforming to the contour of a guide template.

It is still another object of this invention to provide a novel shape cutting apparatus wherein the cutting torch may be adjusted for either front beveling or back beveling without reversal or turning of the torch holder.

A further object of this invention is to provide a novel shape cutting apparatus particularly designed and constructed for substantially eliminating binding of the cutting torch during linear movement thereof for effecting a smooth and even shaped contour for a cut in the wall of a pipe section.

A still further object of this invention is to provide a novel shape cutting apparatus for effecting selected cuts in the wall of a pipe section in such a manner that complementary cuts of adjacent pipe sections will efficiently mate for facilitating the joining thereof.

Other and further objects and advantageous features of the present invention will hereinafter more fully appear in connection with a detailed description of the drawings in which:

FIGURE 3 is an end elevational view of a pipe cutting apparatus embodying the invention.

FIGURE 4 is an elevational view depicting a pipe cutting apparatus embodying the invention in combination with a cutting torch and depicted in position on a pipe section.

FIGURE 5 is a sectional view taken on line 5—5 of FIGURE 2.

Figure 1:
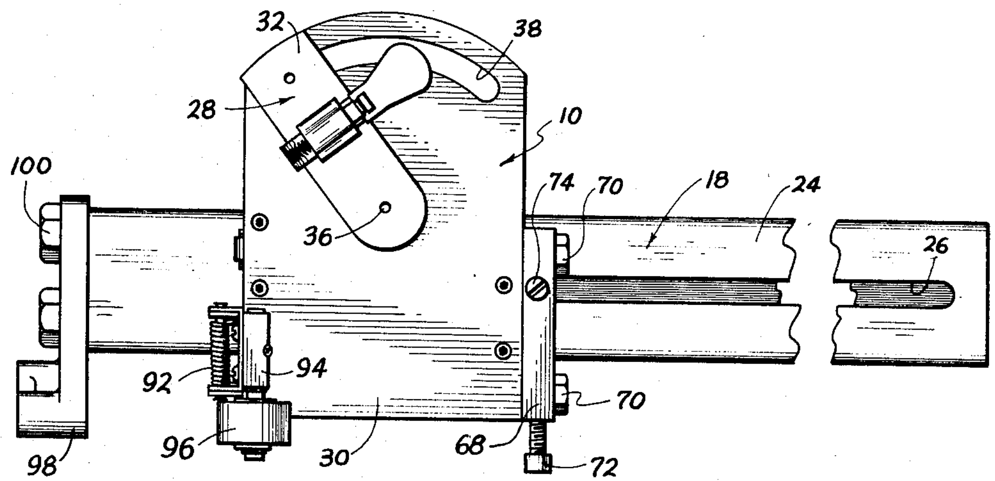
FIGURE 1 is a broken plan view of a pipe cutting apparatus embodying the invention.

Referring to the drawings in detail, reference character 10 generally indicates a shape cutting apparatus for carrying a suitable pipe cutting torch 12, such as utilized in cutting the wall of a pipe section 14. The apparatus 10 may be removably secured to a pipe cutting machine, generally indicated at 16 in FIGURE 4, in a manner as will be hereinafter set forth, whereby the torch 12 may be utilized for cutting the wall of the pipe 14.

The apparatus 10 comprises an elongated slide support 18 of substantially triangular cross sectional configuration, as particularly shown in FIGURES 3 and 5, thus providing three side wall portions 20, 22, and 24. The slide support 18 is preferably hollow and an elongated slot 26 is provided in one of the side walls, for example the side wall 24, to provide communication between the interior and the exterior of the slide support 18.

A torch holder generally indicated at 28 is slidably secured to the slide support 18 in a manner as will be hereinafter set forth and is freely reciprocal therealong. The torch holder 28 comprises a base plate portion 30, having the torch receiving block 32 secured to one face thereof in any suitable manner, such as by a bolt 34, whereby the block 32 is pivotal at 36 with respect to the plate 30. An arcuate slot 38 is provided in the plate 30 for receiving a threaded stud member 40 therethrough, which is carried by the pivotal block 32. A suitable wing nut 42, or the like, may be threadedly secured to the stud 40 to cooperate with a complementary washer 44 for locking the stud 40 in substantially any desired position within the slot 38 to lock the block 32 in substantially any desired angular position. The block 32 is preferably provided with a longitudinally extending arcuate recess 46 (FIGURE 2) on the outer surface thereof for receiving the torch 12 therein. In addition, a suitable flexible metallic strap 48 is carried by the block 32 for receiving the torch 12 therethrough or encircling the torch, and the circular size of the strap 48 may be adjusted by an adjusting member 50, as is well known, for securing the torch 12 in position on the block 32.

Figure 2:
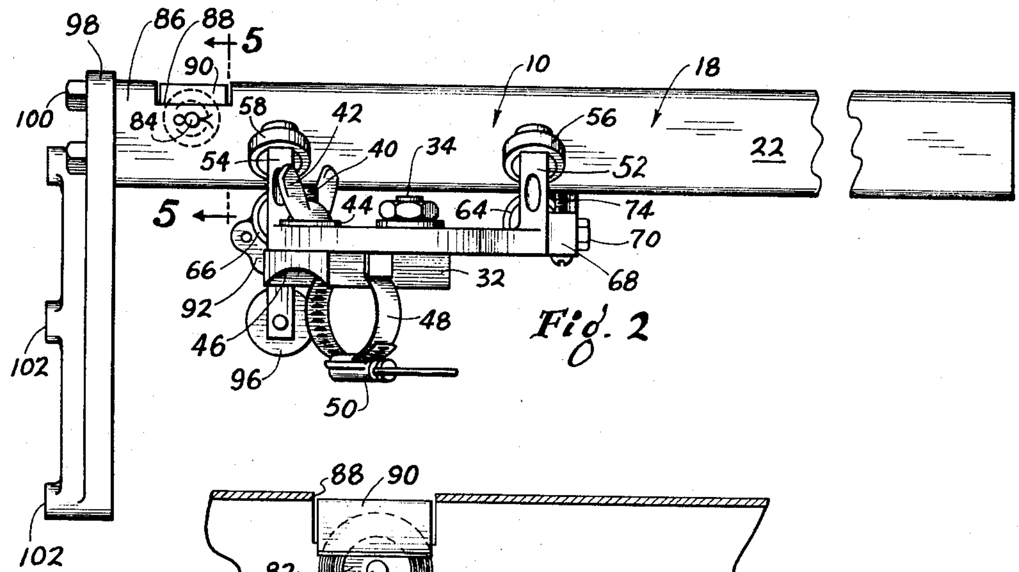
FIGURE 2 is a broken side elevational view of a pipe cutting apparatus embodying the invention.

A pair of spaced outwardly extending bosses 52 and 54 are provided on the opposite face of the plate 30 for supporting suitable roller members 56 and 58 respectively. The rollers 56 and 58 may be journalled on the respective bosses 52 and 54 in any suitable manner and bear against one of the side portions, for example the side portion 22 as shown in FIGURE 2, to facilitate movement of the torch holder 28 along the slide support 18. The rollers 56 and 58 are adjustably secured to the respective bosses 52 and 54 for assuring an efficient engagement with the side wall portion. A second pair of outwardly extending bosses (only one of which is shown at 60 in FIGURE 3) are provided on the plate 30 and spaced from the bosses 52 and 54 for supporting similar roller members 62 (only one of which is shown). The roller 62 are similarly adjustably secured to the bosses 60 and bear against the second side portion, such as the side portion 20 for further facilitating movement of the torch holder 28 along the support 18. A third pair of spaced stationary rollers 64 and 66 is suitably journalled on the plate 30 in recesses (not shown) provided on the face opposite the block member 32. The rollers 64 and 66 bear against the third side wall, such as the side wall 24, and cooperate with the rollers 56 and 58 and 62 for providing free reciprocation of the torch holder 28 along the slide support 18. The adjustability of the rollers 56, 58 and 62 in combination with the stationary rollers 64 and 66 assure an efficient engagement of all the rollers with the support 18 to substantially eliminate any play of moving parts.

An L-shaped bracket 68 is secured adjacent the side of the plate 30 in any suitable manner, such as by a threaded member 70. A threaded set screw 72 extends through one leg of the L-shaped bracket 68 for engagement with the slide support 18 in order to selectively secure the torch holder 28 in position thereon. Of course, when the torch holder 28 is to be moved along the slide support 18, the set screw 72 may be released from the engagement with the slide support 18. A second threaded member 74 extends through the other remaining leg of the L-shaped bracket 68 and extends through the slot 26 provided in the side wall portion 24 of the slide support 18. A suitable stop member or nut 76 (FIGURE 3) may be secured to the end portion of the threaded member 74 which extends through the slot 26 and into the interior of the slide support 18 for precluding accidental removal of the threaded member 74 from the slot 26. In addition, a second stop member or washer 78 may be threadedly secured to the member 74 for cooperating with the stop 76 to retain one end of a negator spring 80 therebetween.

Figure 6:
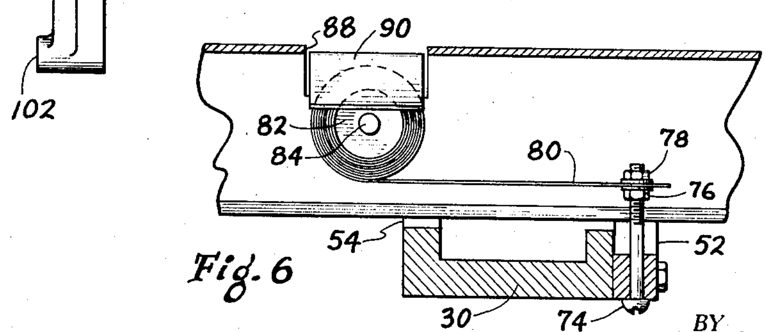
FIGURE 6 is a sectional view taken in line 6—6 of FIGURE 3.

A negator spring is a coil spring or flat spring which has been so constructed as to resist the unwinding of all zones thereof along the length of the spring. In other words, the spring tends to rewind itself, thus acting against any tension or pressure exerted thereon. This type of spring is well known and is of the type shown in the B. Lermont Patents Nos. 2,609,192 and 2,801,669, or the W. J. Cook Patent No. 2,647,743. The opposite end of the negator spring 80 is wound on a spool or roller 82 (FIGURES 5 and 6), which is journalled within the slide support 18 by means of a transversely extending shaft or pin 84, which extends between a converging pair of side walls, such as the side walls 20 and 22.

The pin 84 is preferably disposed in the proximity of one end 86 of the slide support 18, the said end 86 being adapted for connection with the pipe cutting machine 16, as will be hereinafter set forth. A slot or recess 88 is provided in the slide support 18 at the convergence of the walls 20 and 22 in the proximity of the pin 84 to provide clearance for the roller 82 and spring 80 wound therearound. A suitable cover 90, preferably made of a suitable flexible or yieldable material, may be removably secured in the slot or recess 88 in any suitable manner to provide protection for the spring 80 and roller 82 for reducing contamination thereof by dirt or the like.

It will be apparent that any movement of the torch holder 28 along the slide 18 in the right hand direction as viewed in FIGURES 1 and 2 will cause the spring 80 to unwind by virtue of the connection between the spring and the stud 74. The inherent action of the spring 80, however, tends to constantly urge the holder 28 in the left hand direction, as viewed in the drawings. Of course, left hand movement of the torch holder 28 is limited by the engagement of the stud 74 with the closed left end of the slot 26. Conversely, right hand movement of the holder 28 is limited by the engagement of the stud 74 with the closed right end of the slot 26.

A suitable spring urged hinge member 92 is secured to the plate 30 and is preferably oppositely disposed from the bracket 68. The hinge 92 is also secured to a block member or support 94, having a follower member or roller 96 journalled thereon. The hinge 92 permits a certain amount of flexibility or movement of the block 94 while at the same time constantly urging the block in a direction for engagement with the plate 30. The roller 96 is adapted for engagement with the usual guide template 97 such as is commonly used in combination with the pipe cutting machine 16 in a shape cutting operation. The roller 96 rolls along the guide template, following the contour of the guide edge 99 thereof for a purpose as will be hereafter set forth.

A connecting member or bracket 98 is secured to one end of the slide support 18, preferably the end 86 thereof, in any suitable manner, such as by the bolts 100. The bracket 98, in turn, is provided with a plurality of apertured bosses 102 for connection with the pipe cutting machine 16 in the usual manner whereby the entire cutting apparatus 10 will be rotated around the outer periphery of the pipe 14 and in spaced relation thereto as particularly shown in FIGURE 4, and as is well known in pipe beveling or pipe cutting operations.

The pipe cutting machine 16 may be of any suitable type and as depicted herein is secured around the pipe 14 or on the pipe by means of a strap 104, which encircles the pipe for securing the machine 16 thereon. The cutting machine 16 is normally provided with a suitable ring gear 106, which extends around at least a portion of the outer periphery of the pipe 14. In addition, the pipe cutting machine 16 is usually provided with at least one and in most instances a plurality of cooperating gears, generally shown at 108 in FIGURE 4, which mesh with or engage the ring gear 106 and may be rotated around the pipe through 360° through the connection therewith. A suitable operator mechanism 110 is normally provided for actuation of the gears 108, whereby the gears 108 may be moved circumferentially around the pipe through the engagement with the ring gear 106. Since the shape cutting apparatus 10 is secured to the gear portion 108 by the bracket 98, it will be apparent that the entire apparatus 10 is moved circumferentially around the pipe 14 simultaneously therewith.

*Operation*

When it is desired to provide a contoured or shaped cut in the wall of the pipe 14, the cutting machine 16 may be disposed on the pipe in the usual manner as hereinbefore set forth. The disposition of the pipe cutting machine 16 on the pipe 14 places the ring gear 106 in a concentric disposition with respect to the pipe 14. In this position it is the usual practice to place the guide template 97 around the pipe 14 in a concentric relation thereto and extending longitudinally therealong in a right hand direction as viewed in FIGURE 4. The shape cutting apparatus 10 is secured to the machine 16 and extends outwardly therefrom, and more particularly from the gear portion 108 thereof, substantially in longitudinal alignment with the pipe 14. The cutting torch 12 may be secured on the strap member 46 and the strap member 46 may be tightened therearound by means of the adjustable member 50.

The torch 12 may be angularly positioned with respect to the pipe 14 by means of the pivotal or adjustable block 32, in order to provide substantially any desired bevel for the cut in the wall of the pipe. The wing nut 40 and washer 44 may be utilized in the usual manner for securely retaining the block 32 in the desired angular position for retaining the torch in the pre-determined or preselected position. It will be apparent that the torch 12 may be adjusted for the usual forward bevelling cutting operation, or for a back bevelling operation without reversal or movement of the torch holding apparatus 28 with respect to the slide 18 due to the cooperation between the threaded member 40 and the arcuate slot 38.

The set screw 72 may be "backed off" or released from engagement with the slide support 18 in order to permit movement of the torch holder 28 along the slide support 18. The torch holder 28 may thus be manually moved along the slide support 18 until the roller 96 is brought into engagement with the shaped guide edge 99 of the guide template. The action of the negator spring 80 constantly pulls or urges the torch holding apparatus 28 in the direction toward the pipe cutting machine 16, thus maintaining the roller 96 in an efficient engagement with the guide template at all times.

As the pipe cutting machine 16 is actuated for moving the shape cutting apparatus 10 around the pipe 14, the guide roller 96 moves along the shape guide edge of the guide template. Any contour or variation of the guide template transmits longitudinal movement of the roller 96. This movement is in turn transmitted to the torch holder 28 through the block 94 and hinge 92. Whereas the spring 80 permits movement of the torch holder 28 in the right hand direction upon movement of the roller 96, the spring nevertheless continually exerts a pull on the torch holder 28 in a reverse direction, thus maintaining an efficient longitudinal movement of the torch holder 28 in combination with the circular movement thereof around the pipe 14 whereby the torch 12 moves through a path closely conforming to the shape or contour of the guide template. Of course, the cover 90 encloses the spring 80 to protect the spring from debris during operation of the device 10.

In addition, the complementary pairs of rollers 56 and 58, 62 and 64 and 66 ride freely along the respective side walls 22, 20 and 24 of the slide support 18 in a manner substantially precluding binding between the torch holder 28 and slide support 18. Consequently, the combined circular and longitudinal movement of the torch 12 is smooth, with substantially no jerking action, and the pipe may be cut in a contour or shape as established by the contour of the guide template. In addition, the combination of the adjustable rollers and stationary rollers substantially eliminate any play between the moving parts of the device 10.

As hereinbefore set forth, the bracket 32 may be pivoted for positioning the torch 12 for either the usual forward beveling operation or a back beveling operation without movement of the entire torch holder 28. In addition, the hinge 92 permits movement of the roller 96 to an out of the way position during a back beveling operation. Of course, if it is desired to lock the torch holder 28 in a desired longitudinal position with respect to the slide support 18 for precluding reciprocal movement of the torch holder 28 therealong, the set screw 72 may be moved into engagement with the support 18 for retaining the holder 28 in the pre-selected position.

The triangular configuration of the support 18 provides for a three point contact of the bearing members or rollers carried by the holder 28, thus assuring an efficient and smooth linear travel of the holder 28 along the support 18 while the apparatus 10 is moving or rotating around the pipe 14.

From the foregoing it will be apparent that the present invention provides a novel shape cutting apparatus particularly designed and constructed for efficiently cutting the wall of a pipe in a manner closely conforming to the contour of a guide template. The device comprises a triangular slide support having a torch holder slidably mounted therein in a manner providing for a smooth and efficient reciprocal movement of the torch holder whereby friction and binding between the holder and slide support is greatly reduced. Negator spring means is utilized for maintaining the torch holder in constant engagement with the guide template for assuring a precision linear movement of the cutting torch during rotation thereof around the pipe being cut. The novel shape cutting apparatus is simple and efficient in operation and economical and durable in construction.

Changes may be made in the combination and arrangement of parts as heretofore set forth in the specifications and shown in the drawings, it being understood that any modification in the precise embodiment of the invention may be made within the scope of the following claims, without departing from the spirit of the invention.

What is claimed is:

1. A pipe cutting apparatus for a pipe cutting machine having rotatable gear means provided thereon, and comprising a slide support of a substantially triangular cross sectional configuration carried by the pipe cutting machine, said slide support being rotatable about the periphery of a pipe by the rotatable gear means, torch holder means slidably disposed on the slide support, roller means carried by the torch holder means and engageable with each side wall of the triangular slide support for facilitating reciprocal movement of the torch holder therealong, one of said side walls being provided with a longitudinally extending slot, stud means carried by the torch holder and extending through the slot, negator spring means carried by the slide support and anchored to the stud for constantly urging the torch holder in a direction toward the pipe cutting machine, and means cooperating between the torch holder and slide support for locking the torch holder in substantially any desired longitudinal position with respect to the slide support.

2. A pipe cutting apparatus as set forth in claim 1 wherein the roller means comprises complementary pairs of aligned roller members with each aligned pair of rollers engaging one side wall respectively of the slide support to provide a three point bearing contact for ease of movement of the torch holder along the slide support, and one of said pair of rollers being stationary and the remaining pairs of rollers being adjustable to assure an efficient engagement with the side walls of the slide support.

3. A pipe cutting apparatus for a pipe cutting machine and comprising a slide support carried by the pipe cutting machine and rotatable about the outer periphery of a pipe thereby, said slide support being of a substantially triangular cross sectional configuration and extending from the pipe cutting machine in substantial longitudinal alignment with the pipe, a guide template disposed around the pipe, a torch holder slidably disposed on the slide support for holding a cutting torch and in engagement with the guide template, roller means carried by the torch holder and engageable with each side wall of the slide support for facilitating movement of the torch holder therealong, one of said side walls being provided with a longitudinally extending slot, a stud member carried by the torch holder and extending through the slot, and negator spring means carried by the slide support and having one end anchored to the stud for constantly urging the torch holder in engagement with the guide template.

4. A pipe cutting apparatus as set forth in claim 3 and including cover means carried by the slide support for protection of the negator spring means.

5. A pipe cutting apparatus as set forth in claim 3 wherein the torch holder includes means for locking the cutting torch in substantially any desired angular position without movement of the torch holder with respect to the slide support, and guide roller means for engagement with the guide template to transmit reciprocal movement to the torch holder as the slide support is rotated about the pipe.

6. A pipe cutting apparatus as set forth in claim 3 wherein the torch holder comprises a plate member slidably secured to the slide support for reciprocation therealong, a torch receiving block pivotally secured to the plate member for receiving the cutting torch, adjustable strap means carried by the block for securing the cutting torch thereon, means cooperating between the block and the plate for locking the block in substantially any desired angular position with respect to the plate, and guide roller means carried by the plate for engagement with the guide template to transmit reciprocal movement to the torch holder as the slide support is rotated about the pipe.

7. A pipe cutting apparatus for a pipe cutting machine and comprising a slide support carried by the pipe cutting machine and rotatable about the outer periphery of a pipe thereby, said slide support being of substantially triangular cross sectional configuration and extending from the pipe cutting machine in substantial longitudinal alignment with the pipe, a guide template disposed around the pipe, a torch holder slidably disposed on the slide support for holding a cutting torch and in engagement with the guide template, a plurality of pairs of aligned rollers carried by the torch holder with each pair of aligned rollers being in engagement with one side wall respectively of the slide support, one of said pairs of aligned rollers being stationary and the remaining pairs of aligned rollers being adjustable to provide efficient engagement with each side wall, one of said side walls being provided with a longitudinally extending slot, a stud member carried by the torch holder and extending through the slot, negator spring means carried by the slide support and having one end anchored to the stud for constantly urging the torch holder in engagement with the guide template, pivotal block means provided on the torch holder for supporting the cutting torch, means for locking the block means in substantially any desired angular position for desired positioning of the cutting torch, and guide roller means provided on the torch holder for engaging the guide template to transmit reciprocal movements to the torch holder as the slide support is rotated about the pipe.

8. A pipe cutting apparatus for a pipe cutting machine and comprising a slide support carried by the pipe cutting machine and rotatable about the outer periphery of a pipe thereby, said slide support being of a substantially triangular cross sectional configuration and extending from the pipe cutting maching in substantial longitudinal alignment with the pipe, a guide template disposed around the pipe, one side wall of said triangular slide support being provided with a longitudinally extending slot, a torch holder slidably disposed on the slide support for holding a cutting torch and in engagement with the guide template, said torch holder comprising a plate member, a plurality of pairs of aligned rollers journalled on the plate member whereby each pair of aligned rollers is in engagement with one side wall respectively of the triangular slide support for facilitating reciprocation of the torch holder therealong, one of said pairs of aligned rollers being stationary and the remaining pairs of aligned rollers being adjustable to assure an efficient engagement with each side wall, a pivotal block member carried by the plate for receiving the cutting torch, adjustable strap means carried by the block for securing the cutting torch thereto, said plate being provided with an arcuate slot for receiving a threaded stud member therethrough, said stud member being carried by the block member, lock means cooperating with the stud member for locking the block in substantially any desired angular position for selectively positioning the cutting torch without movement of the plate member with respect to the slide support, a support member movably secured to the plate member, a guide roller journalled on the support member for engagement with the guide template, spring hinge means provided for securing the support member to the plate member for maintaining the guide roller in engagement with the guide template, a second stud member carried by the plate and extending through the longitudinal slot, a negator spring carried by the slide support, said negator spring having one end anchored on said second stud member for constantly urging the torch holder in a direction toward the guide template for assuring an efficient engagement of the guide roller thereagainst, and removable cover means carried by the slide support for protection of the negator spring.

9. A pipe cutting apparatus as set forth in claim 8 and including set screw means carried by the torch holder for selective engagement with the slide support to lock the torch holder in substantially any desired longitudinal position with respect to the slide support.

References Cited

UNITED STATES PATENTS

| | | | |
|---|---|---|---|
| 1,852,413 | 4/1932 | Hickey | 266—23 |
| 2,575,737 | 11/1951 | Tyrner | 266—23 |
| 2,813,342 | 11/1957 | Livers | 266—23 X |
| 2,847,204 | 8/1958 | Menser et al. | 266—23 |

J. SPENCER OVERHOLSER, *Primary Examiner.*

E. MAR, *Assistant Examiner.*